United States Patent [19]

Dummersdorf et al.

[11] Patent Number: 5,055,167
[45] Date of Patent: Oct. 8, 1991

[54] METHOD FOR THE COMPLETE UTILIZATION OF HIGH POLYMER WASTE PRODUCTS

[75] Inventors: Hans-Ulrich Dummersdorf; Wolfgang Jahn; Werner Noack, all of Grimma; Wolfgang Heidel, Naunhof, all of German Democratic Rep.

[73] Assignee: Chemieanlagenbau GmbH, Grimma, German Democratic Rep.

[21] Appl. No.: 561,545

[22] Filed: Aug. 1, 1990

[51] Int. Cl.$^5$ ............................................. H05F 3/00
[52] U.S. Cl. .................................... 204/165; 585/241
[58] Field of Search ......................... 204/165; 585/241

[56] References Cited

U.S. PATENT DOCUMENTS 4,657,738  4/1987  Kanter et al. ..................... 204/164
4,740,270  4/1988  Roy ................................. 585/241
4,746,406  5/1988  Timmann ......................... 585/241

Primary Examiner—John F. Niebling
Assistant Examiner—Steven P. Marquis
Attorney, Agent, or Firm—Jordan and Hamburg

[57] ABSTRACT

Polymer waste products are converted into a subdivided form and into a conveyable consistency and supplied to hydrogen plasma jet, preferably with an average mass temperature of at least 1,000° C. and a pressure of 0.05 to 0.5 MPa, so that a mixing of the polymer suspension or granulate with the hydrogen plasma occurs.

In this hydrogen plasma, the polymer waste products are decomposed completely and react to form highly endothermic, valuable products, such as acetylene, ethylene, hydrogen, CO, HCN or HCl.

15 Claims, No Drawings

METHOD FOR THE COMPLETE UTILIZATION OF HIGH POLYMER WASTE PRODUCTS

BACKGROUND OF THE INVENTION

The invention is applicable to the complete material utilization and upgrading of all high polymers provided by the chemical industry, such as plastics, synthetic fibers, etc., which have passed through a single or repeated utilization process and are available unsorted in the form of scrap or secondary raw materials from PVC, polyethylene, polystyrene, polyesters, polyacrylates, etc. with or without contamination and with or without structural damage due to ageing or the action of light or other environmental influences.

In recent years, there has been an increasing search for possible methods to recycle high polymer waste products. These include, particularly, waste products such as bottles, containers, buckets, pipelines, film, insulating materials, foams, packaging materials, panels, building materials, synthetic fibers, etc. from PVC, polyethylene, polystyrene, polyamides, polyesters and polyacrylates, etc., but also intermediates and monomer products, which are required for the production of these high polymers.

A portion of these high polymer materials is already being collected at the present time and more or less basically incomplete recycling possibilities are being employed, which, however, are already realizing some savings in raw materials and energy.

The main path of recycling particularly thermoplastic synthetic waste materials consists of remelting, homogenizing and converting the high polymer waste products.

For example, GDR Patent 222 544 discloses a method for producing molded parts from thermoplastic polyester molding compositions by means of injection molding. GDR Patent 144 885 discloses a similar method for producing molded parts from polyurethane waste, while GDR patent 262 237 discloses a method for the preparation of elastic polyurethane molding waste for this process.

In GDR Patent 137 938, a method is disclosed for the production of molded parts from a mixed plastic composition of secondary polyethylene and rubber.

GDR Patent 247 690 is concerned with producing a rubber mixture from salvaged rubber, which can be injection molded.

German (BRD) Patent 3 603 009 discloses a complete method for producing molded parts, including the process steps of collecting, presorting, cleaning and plasticizing.

Further methods, which relate to this problem, are contained in German (BRD) Patents 3 544 417, 3 901 139, 3 441 906 and 3 242 120, European Patent 0248 239 and the WO 85/00 480.

The methods cited make possible a gainful recycling, which, however, is subject to severe limitations and accordingly is afflicted with disadvantages:

1. If the converted polymer materials are used repeatedly, there is a considerable loss in stability and quality due to ageing. This loss severely limits the areas of use. In addition, the processing of a large number of different colors decreases the optical attractiveness greatly.

It is not possible to pass the polymer material several times through the recycling process, so that the hydrocarbon substance of these products eventually also reaches the garbage dump. A fundamental solution of the raw material problem is thus not achieved by this group of processes.

2. Only thermoplastic high polymer waste products can be processed by the methods given.

3. The high polymer waste products, which are to be processed, must be sorted and generally also cleaned. This requires additional methods (DD 235 376, DD 256 048, DD 233 794, DD 207 629, DE 3634 808, DE 3535 633, DE 3601 175, DE 2900 666, DE 2639 864).

On the other hand, a second group of methods makes a comparatively better re-use of the plastic waste products possible. With this group of methods, re-usable products with a lesser decrease in quality are obtained by selective digestion, in that the conversion carried out is not only physical but also chemical. This group of methods includes one disclosed in GDR Patent 216 474, by means of which, by devulcanizing scrap rubber through splitting the sulfur bonds without affecting the polymer structure and by the reductive replasticizing by the action of aldehydes, a rubber is created, which can be vulcanized once again.

GDR Patent 134 773 discloses a method in which residues of the ethylene suspension polymerization are subjected to a thermooxidative degradation at 130° to 250° C. in the presence of oxygen or oxygen-containing gases, an oxidized polyethylene wax being obtained as product by the addition of a viscosity lowering material.

A method for utilizing isocyanate-containing distillation residues by the conversion of isocyanates is disclosed in GDR Patent 238 988. For this method, the residues are reacted with epoxide compounds at temperatures below 300° C. and mixed with di- or polyisocyanates.

The utilization of special plastic waste is furthermore disclosed in the following patents:

DD 146 026 The production of flexible melt adhesives based on polyester by alcoholysis with continuous addition of diols and polyalkylene oxides at pressures up to 2.0 MPa and subsequent polycondensation DD 130 256 Method for the preparation of melt adhesives from polyester scrap DD 125 979 Method for the utilization of cross-linked polyester resin or epoxide resin scrap DE 3037 829 Conversion of waste from polyolefins in a gentle manner into higher-valued modified pitches and low boiling aromatic compounds and olefins at moderate pressures and temperatures above 300° C.

DE 2951 617 Polyurethane recycling through alcoholysis or acidolysis

DE 2811 203 Method for the recovery of polystyrene through the selective dissolution in liquid $SO_2$ in a first step and the evaporation of the $SO_2$ in a second step EP 0052 213 Method for the catalytic depolymerization of polytetramethylene glycol ether in the pressure of fuller's earth as catalyst at temperatures of 90° to 180° C. with the objective of preparing tetrahydrofuran EP 0048 340 Recovery of caprolactam from nylon oligomers EP 0031 538 Working up polyurethane through alcoholysis and acidolysis EP 000 948 Preparation of polyol-containing liquids from polyurethan waste in the presence of strongly basic compounds at temperatures of 150° to 220° C.

All the methods of this group have the following disadvantages:

1. The field of use is highly specific and directed to a particular polymer type generally representing only a small proportion output of polymer.

2. The problem of sorting the polymers into types remains, unless the starting material is a residue which is obtained directly from polymer production.

3. The waste polymer product is converted into a different, qualitatively more or less high-class, usable product; there is no true recycling to restore the original polymer.

A further known recycling method is the hydrogenation of carbon-containing waste materials at temperatures of 75° to 600° C. and high pressures up to 600 bar (Rheinbraun Method, GDR Patent 249 036). This method, aside from the disadvantages of additionally consuming hydrogen and employing high pressures, which require high technical expenditures, has the disadvantage that undefined hydrocarbon mixtures result, which cannot be used without further processing. A recycling directly into the polymer synthesis is not possible.

Furthermore, pyrolysis methods are known, which operate at temperatures ranging from 150° to 500° C. (DE 3323 161) or 400° to 650° C. (DE 3531 514). The first method can process only thermoplastic materials and low-grade products are formed, the further use of which is difficult. In the second method, low-grade pyrolysis off-gases are subsequently subjected to a thermal combustion without further utilization. The method thus is useful only for the destruction of secondary polymers and enamel sludges.

A method, which also serves only for the elimination of plastic waste, is disclosed in German (BRD) Patent 2409 966. Pursuant to the method protected there, the photodecomposition of plastic waste by sunlight is accelerated significantly by the application of decomposition accelerators, such as manganese, iron, cobalt, nickel or copper salts of a higher fatty acid.

Beyond this, methods are known for the plasma pyrolysis and the plasma gasification of fossil raw materials, such as coal, carbon-containing materials, crude oil and natural gas. The pyrolysis of discarded tires is also known. This pyrolysis leads to low-grade carbon blacks, oils and pyrolysis gases, which cannot be used.

It is an object of the invention to provide a method with which it becomes possible to process all secondary high polymers that arise, preferably those which originally do not contain any volatiles, which can be described with standardized methods of measurement, irrespective of their chemical composition and physical consistency into such a form that the raw material substance contained in them, namely C, H and/or Cl, can be used again completely so that, utilizing existing follow-up chemistry, a synthesis of completely new high polymers from the scrap substance, which can be used without limitations, that is, an almost 100% true recycling, is achieved.

Pursuant to the invention, this objective is accomplished owing to the fact that the high polymer waste products are converted by plasma chemical means into their chemical raw materials, from which they were originally synthesized, such as acetylene, ethylene, hydrogen, HCN, CO, HCl and carbon black. Advisably, the high polymer products are subjected to a plasma pyrolysis under reducing conditions or to a plasma gasification under simultaneously existing reducing and oxidizing plasma conditions.

Preferably, the high polymer waste products are granulated or otherwise subdivided, converted into a conveyable consistency, mixed with superheated steam and supplied to a hydrogen plasma jet with an average mass temperature of at least 1,000° C. and a pressure of 0.05 to 0.5 MPa, so that a mixing of polymer suspension or granulate with the hydrogen plasma occurs. The reactive plasma that is formed subsequently enters a plasma reactor. After a residence time in the plasma of $10^{-3}$ seconds to 30 seconds depending on the chemical composition and the physical state, such as the particle size, the plasma jet is quenched to temperatures below 1,000° C. and, with that, converted into a pyrolysis gas stream, from which the solids which are present, such as coked polymer waste products or carbon black, are removed and the plasma pyrolysis gas is separated completely or partially into its constituents.

For conversion to a conveyable consistency, the subdivided polymer waste products are advisably melted, preferably by means of an extruder, or dissolved and/or suspended in a solvent or an organic solvent mixture, or suspended in water, and the melt, solution and/or suspension may be entrained in superheated steam, hydrogen, methane, carbon dioxide, fuel gas, etc. The complete or partial separation of the plasma pyrolysis gas formed in the plasma process into its constituents is preferably carried out by absorption and low-temperature distillation. The resulting constituents can then be supplied completely or partially once again to appropriate polymer synthesis processes.

The mode of action of the inventive method is based on the fact that long-chain molecules, such as those of all high polymers, even those of a textile nature, have a relatively low bonding energy between the carbon atoms, which makes the splitting into hydrocarbon fragments easier than is possible, for example, in the case of fossil carbon carriers such as coal.

Under the conditions of a reactive hydrogen plasma all high polymers are split into fragments, which fragments split into thermodynamically favored compounds, such as acetylene, ethylene, hydrogen, CO, HCl or HCN, that is, highly energetic compounds, which also represent the chemical starting materials for the production at the present time of all known polymers. For example, polyethylene is reacted by the action of a hydrogen plasma jet according to the following overall reaction equation:

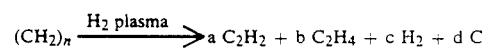

$$(CH_2)_n \xrightarrow{H_2 \text{ plasma}} a\ C_2H_2 + b\ C_2H_4 + c\ H_2 + d\ C$$

The coefficients a, b, c and d depend on the plasma temperature, that is, on the degree of dissociation and the plasma enthalpy. Polyvinyl chloride reacts in the hydrogen plasma according to the following overall reaction equation:

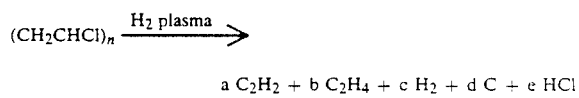

$$(CH_2CHCl)_n \xrightarrow{H_2 \text{ plasma}}$$
$$a\ C_2H_2 + b\ C_2H_4 + c\ H_2 + d\ C + e\ HCl$$

For the magnitude of the coefficients a, b, c and d, the same applies as for the reaction of polyethylene.

The admixture of superheated steam to the polymer granulate or to the polymer suspension before the mixing in with the plasma jet decreases the formation of carbon black in favor of the formation of hydrogen and CO, that is, superheated steam selectively participates in the reaction.

Polyacrylates in the plasma jet are converted into the products acetylene ($C_2H_2$), ethylene ($C_2H_4$), hydrogen ($H_2$), carbon black (C) and HCN.

When reacted in a hydrogen plasma jet, polystyrene yields acetylene ($C_2H_2$), ethylene ($C_2H_4$), hydrogen ($H_2$), carbon black (C) and, depending on the use of superheated steam, CO at the expense of carbon black. It is essential for the inventive method that, in general, the high polymer waste products used do not contain any volatile products, which can be detected by known test methods or which can be measured by standardized methods, for example, as can those in coal.

The necessary reaction time, that is, the residence time of the high polymers in the plasma jet depends on the nature of the introduction of the high polymer waste products into the plasma jet, that is, whether as granulate, suspension or melt, on the particle size of the high polymer waste products and on their chemical structure. It is generally between $10^{-3}$ seconds and 60 seconds.

Finally, any of the chemical raw materials for modern polymer synthesis, that is, acetylene ($C_2H_2$), ethylene ($C_2H_4$), hydrogen ($H_2$), carbon monoxide (CO), prussic acid (HCN), as well as methanol (by way of $H_2$/CO mixtures), acetaldehyde, acetic acid (by way of acetylene) can be obtained pursuant to the inventive method from the plasma pyrolysis of high polymer waste products. With that, the basis is created for the synthesis of new supplies of all known polymer materials with the known follow-up chemistry of the above mentioned raw materials.

EXAMPLE 1

A mixture of more than 50% by weight of thermoplastic high polymer waste products (such as polyethylene) is granulated in an impeller breaker, subsequently melted in an extruder at 115° C. (thermoplastic portion) and forced by this extruder subsequently into an admixing part of a plasma pyrolysis reactor which envelops a hydrogen plasma jet with an average mass temperature of 2,500° C. The surface of the polymer suspension stream, expanding through the admixing part, is removed by the plasma jet and decomposed chemically in the plasma during a reaction time of 10 seconds and converted to acetylene, ethylene and hydrogen. By means of a circulating gas quench, the reactive plasma is "quenched" at the plasma reactor outlet and the products, acetylene, ethylene and hydrogen are stabilized.

After precipitation of the solids and an acetylene solvent scrub, the residual pyrolysis gas mixture is supplied to a gas separation plant in order to obtain the pyrolysis gas components in pure form. These components are then supplied to a polymer synthesis process.

EXAMPLE 2

Polyethylene waste products are granulated in an impeller breaker and subsequently melted and homogenized in an extruder at 180° C. The melt, in a low viscosity state, is atomized by superheated steam at a temperature of 250° C. and a pressure of 0.5 MPa and supplied to a hydrogen plasma jet at an average mass temperature of 3,000° C. The products, acetylene, ethylene, carbon monoxide, hydrogen and carbon, formed during a reaction time of 0.5 seconds in the plasma reactor that is constructed as a vortex reactor, are stabilized at the reactor outlet with cold, circulating pyrolysis gas and, after precipitation of the carbon black, supplied to a gas separation plant.

EXAMPLE 3

Polyvinyl chloride scrap is granulated in an impeller breaker and subsequently mixed in a stirred mixing vessel at a temperature of 80° C. with a solvent mixture of trichloroethylene and carbon tetrachloride. The PVC scrap partially dissolves and the resulting suspension is introduced by means of pump pressure and with the addition of superheated steam to the admixing part of a plasma pyrolysis reactor, in which there is a hydrogen plasma jet with an average mass temperature of 2,000° C. Solvent and polymer scrap are converted together by plasma chemical means in a reaction time of 1 second to acetylene, ethylene, hydrogen, hydrogen chloride and carbon black, the reactive plasma is quenched at the reactor outlet with cold, circulating pyrolysis gas and, subsequent to the mechanical deposition of the carbon black, the residual pyrolysis gas mixture is subjected to a water scrubbing to remove the hydrogen chloride and then supplied to the gas separation process.

A further variation of the embodiment arises, when the polymer/solvent suspension is conveyed by means of pump pressure to the admixing part of the plasma reactor and atomized there by means of 250° C. superheated steam into the hydrogen plasma jet.

EXAMPLE 4

An undefined mixture of different polymer scrap, which is not thermoplastic, is granulated in impeller breakers or hammer mills, subsequently whirled with 250° to 300° C. superheated steam as entraining gas into a plasma reactor which surrounds a hydrogen plasma jet with an average mass temperature of 2,500° C. In the plasma reactor, which is constructed as a fluidized bed reactor, the granulated polymer substance is converted completely, during an average residence time of 1 minute, into high grade polymer starting materials, such as acetylene, ethylene, hydrogen, carbon monoxide and hydrogen chloride. The reactive plasma, which has a residence time of $10^{-3}$ seconds in the reactor, is quenched at the reactor outlet in water and the residual pyrolysis gas then subjected to a carbon black deposition and an HCl scrubbing. The polymer starting materials are separated into their components in a subsequent gas separation analysis.

The pyrolysis gas, leaving the plasma reactor, has the following composition:

| | |
|---|---|
| $C_2H_2$ = | 5 to 10% by volume |
| $C_2H_4$ = | 2 to 3% by volume |
| $H_2$ = | 50 to 70% by volume |
| CO = | 5 to 10% by volume |
| HCl = | 10% by volume. |

Aside from the complete recycling, further advantages of the inventive method are:

1. Conservation of sources of primary energy carriers.

2. Abolition of expenditures for the recovery and working up of fossil raw materials.

3. Reduction in the energy expended for the preparation of polymers to 60 to 70% compared to the route by way of fossil raw materials, since the high polymers are split more easily and more completely.

4. Abolition of expensive and environment-contaminating process steps (for example, in the manufacture of PVC, abolition of the chloroelectrolysis and the carbide furnaces for the acetylene synthesis).

5. Constant renewal of the polymer inventory in the economy, practically without the use of raw materials.

6. The composition of the polymer product mixture affects only the composition of the pyrolysis gas, without adversely affecting the process.

7. Residues adhering to the high polymer waste products, such as household chemicals, are also converted into useful products, such as acetylene, ethylene, carbon monoxide, etc.

We claim:

1. A method for the complete utilization of high polymer waste products or waste product mixtures, comprising converting the polymer waste products by plasma-chemical means into chemical raw materials from which they were originally synthesized.

2. The method of claim 1, in which the polymer waste products are subjected to a plasma pyrolysis under reducing conditions.

3. The method of claim 1, in which the polymer waste products are subjected to a plasma gasification while reducing and oxidizing plasma conditions are present at the same time.

4. The method of claim 1, comprising the following sequence of steps:
   (a) subdividing the polymer waste products;
   (b) converting the subdivided polymer waste products to a conveyable consistency;
   (c) conveying the conveyable polymer waste products to and dispersing them in a hydrogen plasma jet having an average mass temperature of at least 1,000° C. and a pressure of 0.05 to 0.5 MPa;
   (d) after a predetermined residence time of the polymer waste products in the plasma sufficient for reaction of the polymer waste products to form said chemical raw materials, quenching the plasma jet to temperatures below 1,000° C. thereby to convert the plasma jet into a plasma pyrolysis gas stream;
   (e) removing any solids from the plasma pyrolysis gas stream; and
   (f) separating at least part of the plasma pyrolysis gas into its constituents.

5. The method of claim 4, in which in step (b) the subdivided polymer waste products are converted into a conveyable consistency by being melted.

6. The method of claim 4, in which in step (b) the subdivided polymer waste products are converted into a conveyable consistency by being mixed with an organic solvent or solvent mixture.

7. The method of claim 4, in which in step (b) the subdivided polymer waste products are converted into a conveyable consistency by being mixed with water.

8. The method of claim 4, in which the subdivided polymer waste products are entrained in a gas or vapor and thereby conveyed to and dispersed in the plasma jet.

9. The method of claim 4, in which in step (f) the separation is by absorption and low temperature distillation.

10. The method of claim 4, comprising an additional step (g), supplying said constituents to a polymer synthesis process as chemical raw materials therefor.

11. The method of claim 9, comprising an additional step (g), supplying said constituents to a polymer synthesis process as chemical raw materials therefor.

12. The method of claim 4, in which the residence time is $10^{-3}$ to 30 seconds.

13. The method of claim 12, in which the solids removed in step (f) include at least one of coked polymer waste products and carbon black.

14. The method of claim 5, in which the melting is effected by extruding the subdivided polymer waste products by means of an extruder.

15. The method of claim 8, in which the gas or vapor comprises at least one of superheated steam, hydrogen, methane, carbon dioxide and fuel gas.

* * * * *